Figure 1:
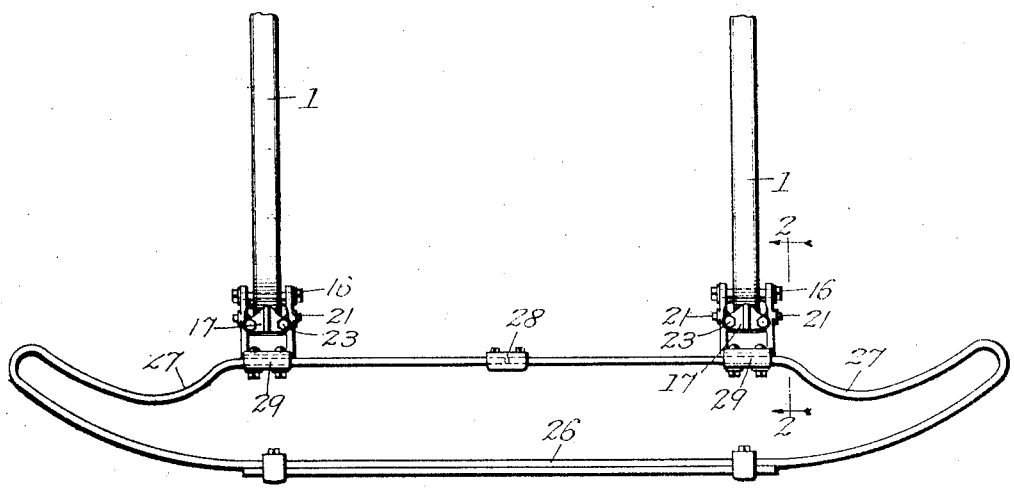

W. G. PANCOAST AND W. J. GROTENHUIS.
BUMPER ATTACHMENT.
APPLICATION FILED JUNE 13, 1919.

1,344,649.

Patented June 29, 1920.
2 SHEETS—SHEET 1.

Inventors
William G. Pancoast
William J. Grotenhuis
James R. Offield. Atty.

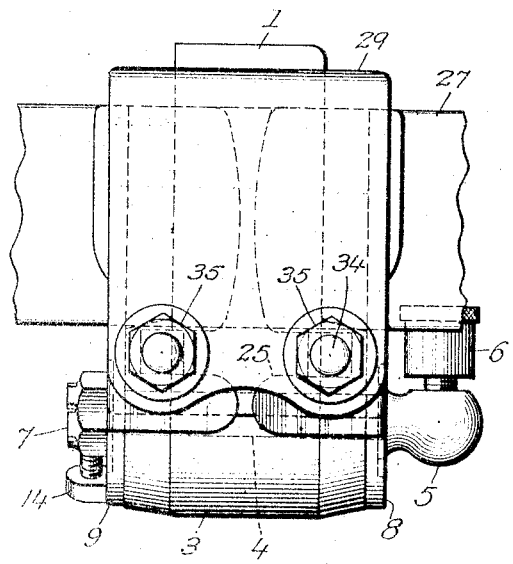
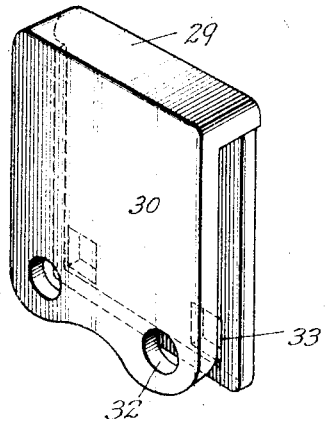
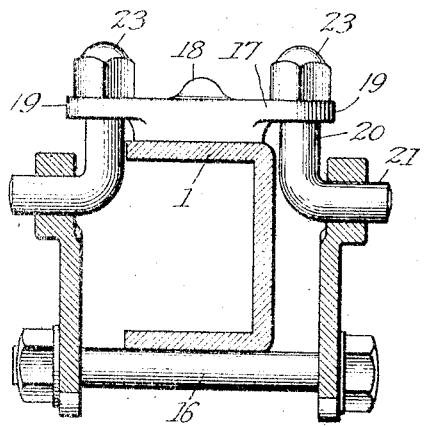
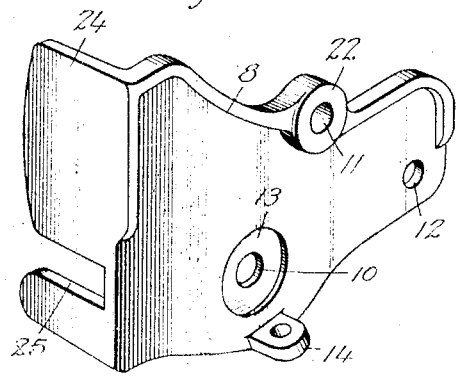

UNITED STATES PATENT OFFICE.

WILLIAM G. PANCOAST AND WILLIAM J. GROTENHUIS, OF CHICAGO, ILLINOIS, ASSIGNORS TO BIFLEX PRODUCTS COMPANY, OF WAUKEGAN, ILLINOIS, A CORPORATION OF ILLINOIS.

BUMPER ATTACHMENT.

1,344,649.　　　Specification of Letters Patent.　　Patented June 29, 1920.

Application filed June 13, 1919. Serial No. 303,920.

*To all whom it may concern:*

Be it known that we, WILLIAM G. PANCOAST and WILLIAM J. GROTENHUIS, both citizens of the United States, and both residents of Chicago, in the county of Cook and State of Illinois, have invented certain new and useful Improvements in Bumper Attachments, of which the following is a specification.

Our invention has reference more particularly to brackets for attaching a bumper to the side frame members or sills of an automobile or vehicle and the means for securing the bumper to these brackets.

It is customary for the purpose of attaching bumpers to automobiles to provide brackets which may be secured to the front or rear ends of the car sills to mount the bumper at the ends of the sills, as the latter, being main members of the car frame, afford an effective and substantial means to resist the impact upon the bumper. Some of the brackets heretofore provided have been attached to the end of the car sill by means of the spring bolt customarily provided at this point, and others have been arranged to clamp onto the end of the sill, and the bumpers are connected to these brackets in various ways, some resiliently and others rigidly, depending upon the type of bumper which is employed.

The principal objects of our invention are to provide attaching brackets which are secured in place on the end of the sill by means of the bolt which connects the usual spring with the end of the sill and also by clamping the brackets onto the end of the sill so as to afford increased security; to provide clamping means engaging above and below the sill and fitting against the downturned tapered end thereof to hold the bracket securely in place; to hold brackets clamped in this manner onto the tapered end of the sill against sliding displacement owing to the tapered form of the sill by locking the brackets in position by means of the spring connecting bolt; to provide attaching brackets composed of opposed sections which are adjustable to fit sills of various sizes; to provide a detachable connection of the bumper with the bracket whereby the bumper is firmly secured in place; to provide clamping means permitting relative adjustment of the two parts of the bracket and adapted to be secured to both parts thereof for securing the bumper to the brackets; and in general to provide improved brackets of a universal character adapted to fit sills of various forms and sizes whereby a bumper may be conveniently mounted on an automobile or other vehicle.

On the drawings—

Figure 2:
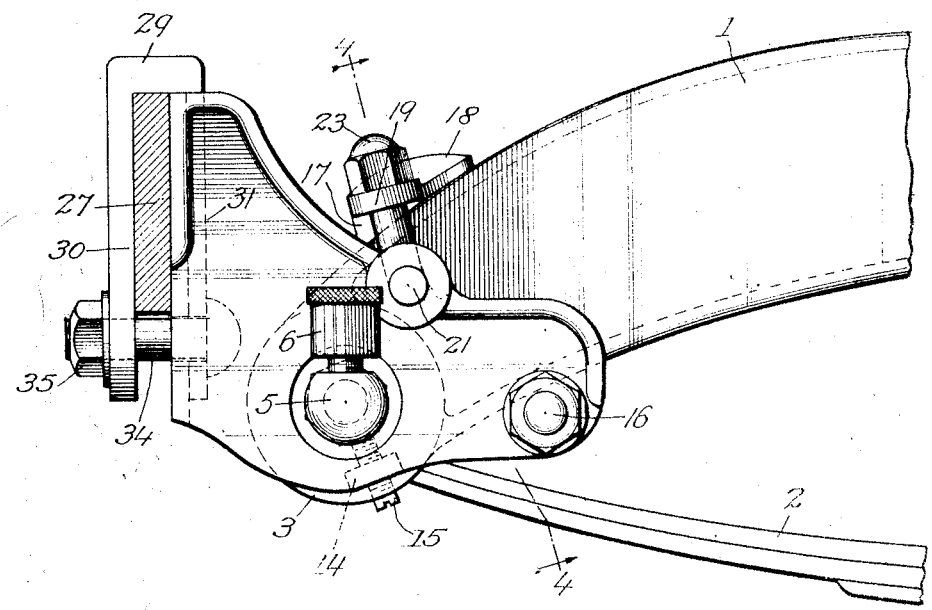

Figure 1 is a top view of end portions of sills with a bumper attached thereto in accordance with our invention, Fig. 2 is an enlarged sectional view on the line 2—2, Fig. 1, showing the attaching bracket and a portion of the sill in side elevation, Fig. 3 is a view looking at the left hand end of the structure shown in Fig. 2, Fig. 4 is a sectional view on the line 4—4, Fig. 2, Fig. 5 is a perspective view of the clamp for securing the bumper to the bracket, and Fig. 6 is a perspective view of a half section of the bracket for attaching the bumper to the car sill.

The reference numeral 1 indicates the end portion of a sill such as is used in automobiles, and 2 is a portion of the usual supporting spring which it is the usual practice to provide with a loop at the end which loop is pivoted in a socket 3 provided therefor at the end of the sill 1 by a pivot bolt 4 which is inserted through apertures in the side walls of the socket 3 and the loop at the end of the spring 2. The structure shown is in a measure typical of the construction of the front ends of automobile sills and the connection of the supporting springs thereto and is illustrative particularly of the manner of connecting the bumper to the front end of an automobile. However, some automobiles have the rear ends of the sills constructed in a somewhat similar manner and our invention is adapted to be applied thereto, or, with necessary modifications, to the rear ends of automobiles which have a rear end structure somewhat different from that shown herein.

It is a common practice to provide the spring bolt 4 with a head 5 at one end having an oil or grease cup 6 communicating through a passageway in the head 5 and bolt 4 to lubricate the bearing surfaces of the spring connection, and the opposite end of this bolt is threaded and provided with a polygonal nut 7.

The bumper attaching bracket comprises right and left hand side plates 8 and 9 which are adapted to be clamped on opposite sides of the sill 1, each having apertures 10, 11 and 12. The spring bolt 4 is removed in mounting the pair of brackets and reinserted in place, being passed through the apertures 10 of both plates 8 and 9, after which the nut 7 is turned onto the end of the bolt to clamp the plates 8 and 9 against the sides of the sill 1. The plates 8 and 9 may be counter-bored on their outer sides around the apertures 10 as indicated at 13 to decrease the thickness of the wall and afford recesses to receive the head 5 and nut 7 of the bolt 4 thus not materially increasing the length of bolt required and enabling the bolt 4, which was used previous to the attachment of the bracket to connect the spring 2 with the sill 1, to be employed in attaching the brackets 8 and 9. A lug 14 may be provided on one of the side plates 8 or 9 and have a set screw 15 threaded therethrough against the side faces of the nut 7 to lock the latter against turning on the bolt 4.

The apertures 12 in the plates 8 and 9 are located adjacent the rear ends of the plates and have a bolt 16 inserted therethrough under the sill 1 at a distance rearwardly from the bolt 4 so as to engage against the under side of the sill and afford one member of a vertical clamping connection of the brackets with the sill. A strap or cross plate 17 is centrally enlarged at 18 and shaped to fit the curvature of the upper surface of the sill 1 and has apertured ears 19 through which are inserted the upper ends of bolts 20, each of which has the lower end 21 bent laterally and inserted through one of the apertures 11 of the plates 8 and 9. A boss 22 is preferably formed around each aperture 11 to provide a substantial bearing for the outturned end 21 of the bolt and to bear the strain when the nuts 23 are turned down on the upper ends of the bolts 20 against the ears 19, the tightening of these nuts serving to clamp the sill 1 between the bolt 16 and plate 17 so as to coöperate with the bolt 4 to secure the brackets on the sill.

Each plate 8 is provided at its forward end beyond the end of the sill 1 with an inturned flange 24 and each of these flanges is notched or slotted at 25 adjacent the lower end. When the plates 8 and 9 are clamped onto the end of the sill 1 as hereinbefore described, the flanges 24 and the slots 25 are positioned in alinement as shown by dotted lines in Fig. 3.

The bumper which we prefer to use in connection with these brackets and which we have shown herein consists of an elongated flat bar 26 which extends transversely of the car and has the ends looped rearwardly and inwardly as at 27 to afford a resilient construction to resist impact, and the inner ends of the inturned end portions 27 may be secured together, if desired, by a clamp such as indicated at 28. Our invention, however, is not restricted to this particular type of bumper but may be employed in connection with other types if desired as will be readily apparent. The bumper, of whatever type, is preferably detachably secured to the forward ends of the plates 8 and 9 and with the bumper formed of a flat bar, as in the illustration, we provide a U-shaped clamp 29 with wide depending arms 30 and 31 spaced apart a sufficient distance to admit the bumper bar and flanges 24 therebetween. Corresponding bolt holes 32 and 33 are provided in the arms 30 and 31 at each side thereof, the latter being preferably squared to take a square shoulder under the head of the bolt 34 whereby the latter is held from turning. The clamp 29 is inserted over the inturned flanges 24 of the plates 8 and 9 and the inturned end 27 of the bumper 26 inserted between the arms of the clamp in front of the flanges 24. Bolts 34 are then inserted through the openings 32 and 33, being passed through the slots 25 and under the bar 27, and the nuts 35 turned on the ends of these bolts so as to draw the arms 30 and 31 together and clamp the flanges 24 and the bar 27 securely in position therebetween.

It will be observed that by employing the two side plates 8 and 9 with the inturned flanges 24 and slots 25 and clamp 29, a large range of adjustment is provided enabling the bracket to be applied to the ends of sills of various lateral dimensions and by using the vertical clamping arrangement consisting of the bolt 16 and clamp plate 17, the lateral adjustment of the plates 8 and 9 is not only permitted but the bracket is adapted to fit sills of various forms and vertical dimensions. Furthermore, with the bumper mounted on the forward end of the bracket, as shown herein, impact strains are not only resisted by the lateral frictional engagement and bolt connection of the plates 8 and 9 effected by the bolt 4, but also by the vertical clamping engagement and particularly the angular engagement of the clamp plate 17 against the inclined upper surface of the sill 1, thus affording a rigid connection distributing the impact strains so as to be effectively resisted by the connection with the sill without danger of injury to the bolt 4 or the sill itself.

While we have shown and described our invention in a preferred form, we are aware that various changes and modifications may be made without departing from the principles of our invention, the scope of which is to be determined by reference to the appended claims.

We claim as follows:

1. In a bumper attachment, the combination of companion bracket members adapted for detachable connection on opposite sides of a vehicle sill and capable of lateral adjustment relative to said sill, a bumper engaging the outer ends of said brackets, and means for attaching said bumper to said brackets in the several positions of adjustment.

2. In a bumper attachment, the combination of a pair of corresponding bracket members adapted to be clamped on the opposite sides of a vehicle sill and each having an inturned flange at the outer end thereof, a bumper, and means for detachably securing the bumper to said flanges of the bracket members.

3. In a bumper attachment, the combination of a pair of bracket members adapted to clamp the end of a vehicle sill therebetween and each having a laterally extending upright flange at the outer end, a bumper, and a clamp detachably engaging the bumper and the flanges to clamp the bumper to the flanges.

4. In a bumper attachment, the combination of an attaching bracket comprising a pair of relatively adjustable plates adapted to clamp the end of a vehicle sill therebetween and each having a matching inturned flange at the forward end, a bumper, a yoke for detachably clamping the bumper onto said inturned flanges, and means connecting the yoke with the flanges and permitting relative adjustment of said bracket members and their flanges.

5. In a bumper attachment, the combination of an attaching bracket comprising relatively separable plates adapted to clamp the end of a vehicle sill therebetween and each having a matching inwardly extending flange at the outer end, a bumper, a yoke for clamping the bumper onto the inturned flanges, bolts engaging the inturned flanges and the yoke for contracting the arms of the yoke for clamping the bumper onto the flanges, said flanges being provided with laterally elongated apertures for the bolts so as to permit relative lateral adjustment of the bracket plates.

6. In a bumper attachment, the combination with a vehicle sill having a supporting spring pivotally connected to the end thereof, of bracket members clamped on opposite sides of said sill, connecting members including the spring pivot, and sill engaging members permitting the vertical and lateral adjustment of said bracket members relative to said sill, and means for attaching a bumper to said brackets.

7. In a bumper attachment, the combination with a vehicle sill having a supporting spring pivotally connected to the end thereof, of an attaching bracket comprising relatively adjustable side plates mounted on the spring pivot and clamped against the opposite sides of the sill, means adjustably connected with the side plates to clamp against the upper and lower surfaces of the sill, and a bumper connected with the side plates beyond the end of the sill.

8. In a bumper attachment, the combination with a vehicle sill having a supporting spring pivotally connected to the end thereof, of a bracket comprising a pair of side plates secured on the spring pivot in clamping engagement against the lateral walls of the sill, a transverse bolt spaced rearwardly from the spring pivot and extending under the sill, a clamping member pivotally connected to the side plates and engaging over the top of the sill intermediate of the pivot bolt and second mentioned bolt and having means for adjustably engaging the clamping member with the upper surface of the sill, and a bumper secured to the side plates beyond the end of the sill.

9. In a bumper attachment, the combination with a vehicle sill having a supporting spring pivotally connected at the end thereof, of a bracket comprising a pair of side plates secured on the spring pivot in clamping engagement against the sides of the sill and having matching inturned flanges at their forward ends beyond the end of the sill, means on the plates spaced rearwardly from the spring pivot and extending inwardly under the sill, a clamp overlying the sill and adjustably connected with the side plates to clamp the sill between said rearwardly spaced means, and a bumper detachably and adjustably secured to the inturned flanges of the side plates.

10. In a bumper attachment, the combination of a sill, a supporting spring, a pivot bolt pivotally connecting the end of the spring to the end of the sill and having a nut threaded on the end thereof, a bracket comprising a side plate secured on the pivot bolt and clamped thereby against the side of the sill, means on the bracket spaced rearwardly from the pivot bolt for clamping the bracket on the sill, a bumper mounted on the bracket beyond the end of the sill, and adjustable means on the bracket engaging the nut of the pivot bolt to lock said nut from turning.

In witness whereof we have hereunto subscribed our names this 10th day of June, A. D. 1919.

WILLIAM G. PANCOAST.
WILLIAM J. GROTENHUIS.